US010872319B2

(12) United States Patent
Bell (10) Patent No.: US 10,872,319 B2
(45) Date of Patent: Dec. 22, 2020

(54) SYSTEMS FOR PROVIDING SERVICE NOTIFICATIONS TO A PRODUCT (71) Applicants: BSH Home Appliances Corporation, Irvine, CA (US); BSH Hausgeräte GmbH, Munich (DE)

(72) Inventor: Larry Bell, Winterville, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 797 days.

(21) Appl. No.: 14/813,529

(22) Filed: Jul. 30, 2015

(65) Prior Publication Data
US 2017/0032332 A1 Feb. 2, 2017

(51) Int. Cl.
*G06Q 10/00* (2012.01)
*G06Q 30/00* (2012.01)

(52) U.S. Cl.
CPC .......... *G06Q 10/20* (2013.01); *G06Q 30/014* (2013.01)

(58) Field of Classification Search
CPC .............................. G06Q 30/014; G06Q 10/20
USPC ........................................................ 705/305
See application file for complete search history.

(56) References Cited

U.S. PATENT DOCUMENTS

| 6,359,270 | B1 | 3/2002 | Bridson |
| 6,826,267 | B2 | 11/2004 | Daum et al. |
| 7,181,291 | B2 | 2/2007 | Boeldt et al. |
| 7,860,803 | B1 * | 12/2010 | Chang ................... G06Q 10/10 235/380 |
| 8,270,933 | B2 * | 9/2012 | Riemer ............ H04M 1/72577 455/345 |
| 8,335,826 | B2 | 12/2012 | Kinoshita et al. |
| 8,769,525 | B2 | 7/2014 | Dirstine et al. |
| 8,799,406 | B1 | 8/2014 | Slonh |

(Continued)

FOREIGN PATENT DOCUMENTS

| CN | 106020014 A | * 10/2016 | ........... H04L 9/3247 |
| WO | 2014063195 A1 | 5/2014 | |

OTHER PUBLICATIONS

Kazuya Arakawa and Masahiro Inoue, IEEE, Conflict Resolving System Among Integrated Services in Home Network System (Year: 2011) https://ieeexplore.ieee.org/stamp/stamp.jsp?tp=&arnumber=5722748.*

(Continued)

*Primary Examiner* — Minnah L Seoh
*Assistant Examiner* — Debra L Glennie
(74) *Attorney, Agent, or Firm* — Michael E. Tschupp; Andre Pallapies; Brandon G. Braun (57) ABSTRACT

A domestic appliance comprising communication circuitry and a processing system, including at least one processor, may be coupled to the communication circuitry. The processing system may be configured to: receive, using the communication circuitry, service data from a server, the service data including a service code identifying one or more services that need to be performed on the domestic appliance; disable, based on the received service code, one or more features of the domestic appliance; and in response to an input indicating that the one or more services corresponding to the service code have been performed on the domestic appliance, enable the one or more features of the domestic appliance that were disabled.

18 Claims, 5 Drawing Sheets

(56) References Cited

U.S. PATENT DOCUMENTS

| | | | |
|---|---|---|---|
| 2001/0025392 A1* | 10/2001 | Youn | D06F 33/02 8/159 |
| 2003/0163489 A1* | 8/2003 | Tonack | G05B 23/0216 |
| 2003/0179746 A1 | 9/2003 | Moon et al. | |
| 2004/0068484 A1 | 4/2004 | J'maev | |
| 2005/0004811 A1* | 1/2005 | Babu | G06Q 10/06395 705/7.41 |
| 2006/0149612 A1* | 7/2006 | Engle | G06Q 10/0631 705/7.12 |
| 2007/0220907 A1* | 9/2007 | Ehlers | F25B 49/005 62/126 |
| 2008/0231468 A1* | 9/2008 | Myllymaki | F24C 15/2021 340/870.17 |
| 2010/0174668 A1* | 7/2010 | Finch | G06Q 50/06 705/412 |
| 2011/0022358 A1* | 1/2011 | Han | G05B 19/0428 702/183 |
| 2012/0226764 A1* | 9/2012 | Philip | H04L 67/025 709/208 |
| 2013/0073690 A1* | 3/2013 | DeSalvo | H04L 67/125 709/219 |
| 2013/0299569 A1* | 11/2013 | Gentile | G06Q 10/08 235/375 |
| 2014/0067094 A1 | 3/2014 | Park et al. | |
| 2014/0067131 A1 | 3/2014 | Park et al. | |
| 2014/0156082 A1 | 6/2014 | Ha | |
| 2014/0197934 A1 | 7/2014 | Ha | |
| 2015/0156084 A1 | 6/2015 | Kaminsky et al. | |

OTHER PUBLICATIONS

International Search Report PCT/EP2016/067012 dated Sep. 30, 2016.

Tajika et al., Networked home appliance system using Bluetooth technology integrating appliance control/monitoring with internet service, Source: IEEE Transactions on Consumer Electronics, vol. 49, Iss. 4, pp. 1043-1048, published Nov. 2003.

Uchihira et al., Service Innovation Structure Analysis for Recognizing Opportunities and Difficulties if M2M Businesses, Source: 2014 Proceedings of PICMET '14: Infrastructure and Service Integration, published 2014.

* cited by examiner

SYSTEMS FOR PROVIDING SERVICE NOTIFICATIONS TO A PRODUCT

FIELD OF THE TECHNOLOGY

The present technology relates to methods and systems for providing service notifications to a product. More particularly, the present technology relates to methods and systems of providing a recall notice to an appliance (e.g., domestic appliance).

BACKGROUND

Companies developing and/or manufacturing products devote significant amount of resources to ensure that the products they provide meet customers' expectations and safety requirements. However, after a product is released to customers, a company may become aware of issues with the product. For example, the company may realize that the product does not operate as expected in certain environments. Other times, new safety regulations may require the company to make modifications to the product.

BRIEF SUMMARY

Companies send out recall notices by mail to customers or provide such notices in newspaper publications when issues are discovered with the products. However, current methods for notifying the customers are slow and do not effectively notify all of the customers in possession of the product. In addition, the user of the product may not always take action to correct the problem identified in the recall notice. This is not desirable because if a needed service is not performed in response to a recall notice, the user of the product and or other people may be placed in danger by continuing to use the product.

Thus, a need has developed to address one or more shortcomings of the prior art.

The present technology addresses one or more the shortcomings of the prior art.

An aspect of the present technology includes methods and systems to provide service notifications to a product. The service notification may be transmitted in response to a request from the product or may be sent periodically to the product registered with a service notification distribution system. The product may display the received service notification on a display included in the product. The product may be configured to require the user of the product to acknowledge seeing the service notification before being able to use the product. The product may be configured to disable one or more features of the product until a service associated with the received service notification is addressed.

Another aspect of the present technology includes an appliance (e.g., domestic appliance) comprising communication circuitry and a processing system including at least one processor. The processing system of the appliance may be coupled to the communication circuitry. The processing system may be configured to: receive, using the communication circuitry, service data from a server, the service data including a service code identifying one or more services that need to be performed on the appliance; disable, based on the received service code, one or more features of the appliance; and in response to an input indicating that the one or more services corresponding to the service code have been performed on the appliance, enable the one or more features of the appliance that were disabled.

Another aspect of the present technology includes an appliance comprising communication circuitry and a processing system, comprising at least one processor and memory, the processing system coupled to the communication circuitry. The processing system may be configured to: transmit, using the communication circuitry, a request for recall information for the appliance; in response to the request, receive, from a server, recall information for the appliance; and display, on a display coupled to the appliance, the received recall information for the appliance.

Another aspect of the present technology includes a device for providing service data to one or more appliances. The device may comprise communication circuitry, storage, and processing system including at least one processor. The storage may store recall notices for a plurality of appliances, each recall notice being associated with one or more appliances. The processing system may be coupled to the communication circuitry and the storage. The processing system may be configured to: receive, using the communication circuitry, a service data request from an appliance, the service data request include appliance identification information of the appliance; determine, based the appliance identification information, whether one or more of the recall notices stored in storage apply to the appliance requesting service data; and when a determination is made that the one or more of the recall notices stored in the storage apply to the appliance requesting the service data, transmit, using the communication circuitry, the service data with information identifying the one or more of the recall notices applying to the appliance requesting the service data.

Another aspect of the present technology includes a method to provide service notifications to a product. The method may include transmitting a service notification to a product. The service notification may be transmitted in response to a request received from the product or may be sent periodically to the product registered with a service notification distribution system. The method may include receiving a confirmation from the product that the service notification has been seen by a user associated with the product and/or that product services associated with the transmitted service notification have been performed on the product.

Other aspects, features, and advantages of this technology will become apparent from the following detailed description when taken in conjunction with the accompanying drawings, which are a part of this disclosure and which illustrate, by way of example, principles of this technology.

DETAILED DESCRIPTION

The following description is provided in relation to several examples which may share common characteristics and features. It is to be understood that one or more features of any one example may be combinable with one or more features of the other examples. In addition, any single feature or combination of features in any of the examples may constitute additional examples.

Figure 1:
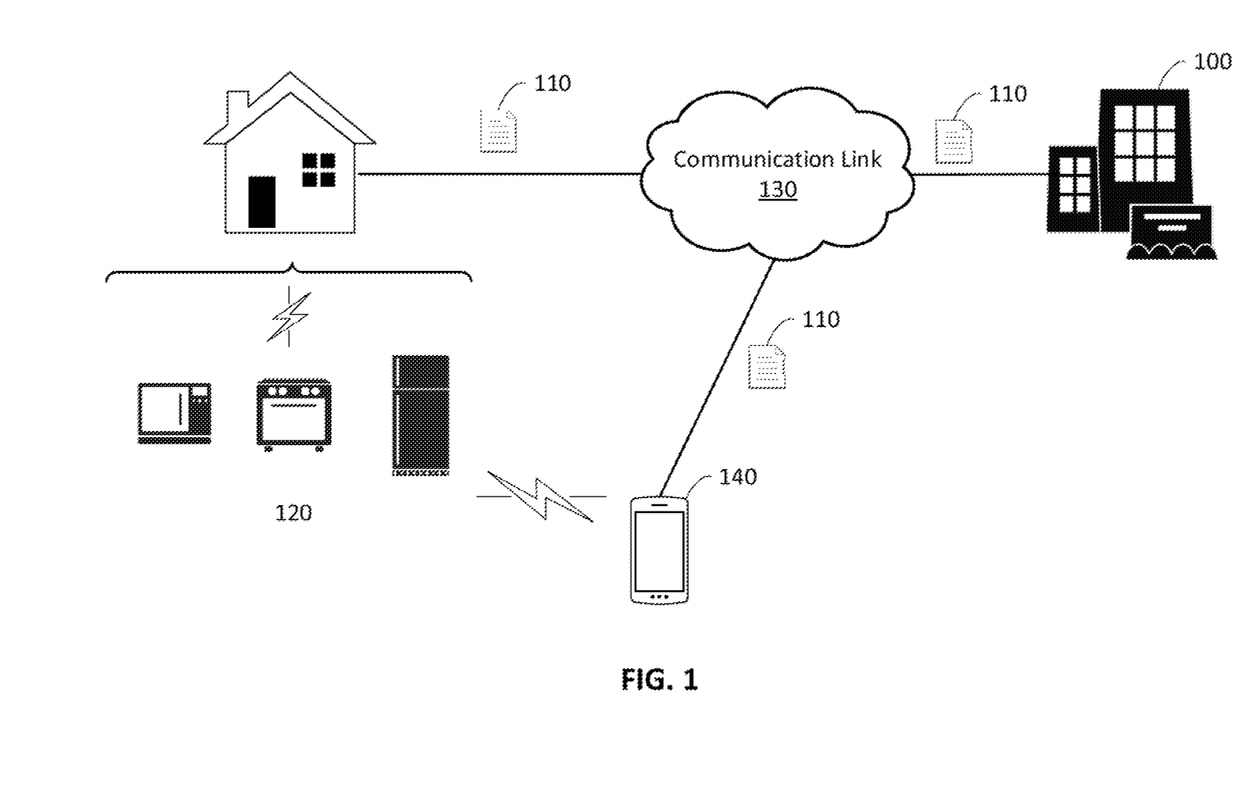
FIG. 1 illustrates a system for providing product service notifications according to an embodiment of the present disclosure.

FIG. 1 illustrates a system for providing product service notifications according to an embodiment of the present disclosure. As shown in FIG. 1, a service notification provider 100, such as a manufacturer or distributor of the product, may provide service data 110 to one or more products 120 via a communication link 130. The service data 110 may be sent directly to the product 120. The service data 110 received by the product 120 may be displayed to a user of the product 120 on a display of the product 120. The product 120 may also perform one or more functions (e.g., disable one or more features of the product, send a notification to another device, correct issue identified in the service data, download updating software from location identified in the service data, run a cycle on the product in a manner identified in the service data) in response to the received service data 110.

Accordingly, a service notification system managed by the manufacturer or distributor of the product can directly communicate with the product 120 and send a service notification to the product 120 such that a user of the product is aware of the services that need to be performed on the product 120. The service data can be quickly provided to the user that uses the product 120. In addition, if ownership of the product 120 is changed, the new user can also be effectively notified of the needed services even when the manufacturer or distributor of the product is not notified of changed ownership.

In one embodiment, the product 120 may be configured to send the service data 110 to another device 140 (e.g., a mobile device, smartphone, smart watch or tablet) for display to the user. The device 140 may include an application that receives the services notifications from the product 120. In one example, the service data 110 may be sent directly from the service notification provider 100 to the other device 140. The product 120 may provide information about where to send the service notification (e.g., an email address or a telephone number) with a request for service data sent to the service notification provider 100.

The service data 110 may include one or more product service notifications for one or more products 120. In one embodiment, the service data 110 may include product service notifications only for the product 120 requesting the service data 110. The service data 110 may include one or more product recalls, services that need to be performed on the product 120, and/or product warnings (e.g., related to non-safety critical repairs for the appliance). Accordingly, the service data 110 may include both information related to safety critical repairs for the product and information related to non-safety critical repairs for the product. The service data 110 may include contact information (e.g., service call center) for scheduling a service to be performed on the product 120 and/or contact information for one or more companies to perform the services on the product 120. In one embodiment, the service data may include one or more service codes. Each service code may be a combination of alphanumeric characters and/or symbols. Each service code may corresponds to a service that needs to be performed on the product and/or to a recall of the product.

The product 120 may include a product purchased by a user to be used within or out outside of the home. For example, the product 120 may include a home appliance (e.g., a dishwashing machine, an oven, a microwave, a refrigerator, a washing machine, cooling and heating systems, a cooktop, or a toaster oven). The product 120 may include products that are regulated by the Consumer Product Safety Commission (CPSC), National Highway Traffic Safety Administration (NHTSA), Food and Drug Administration (FDA), or the US Coast Guard.

In another example, the product 120 may include a portable device (e.g., a smartphone, camera or a GPS system), a vehicle (automobile or a motorcycle) or a device used within the vehicle. The product 120 is not limited the examples provided above, but may include other products that can be connected to a communication link 130 for receiving service notifications. For example, the product 120 may be a product described as a SMART device cable of connecting to other devices or networks via different protocols such as Bluetooth, NFC, WiFi, 3G, etc., that can operate to some extent interactively and autonomously.

The service notification provider 100 is not limited to being a manufacturer or distributor of the product providing the service notifications to the product 120. The service notification provider 100 may include another entity (such as a separate company or a government entity) that is responsible for providing service notifications to one or more different products.

Figure 2:
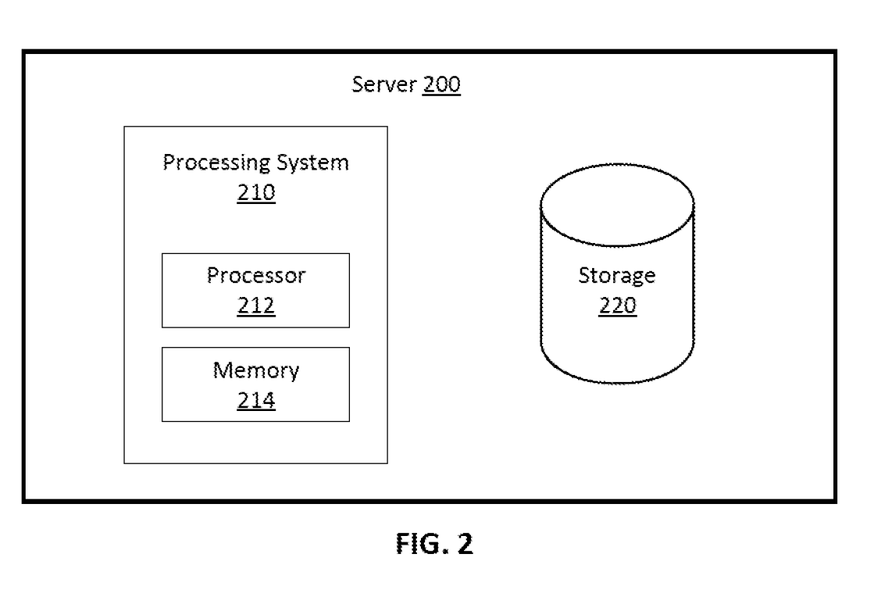
FIG. 2 illustrates a service notification server configured to provide service data according to an embodiment of the present disclosure.

FIG. 2 illustrates a service notification server 200 configured to provide service data according to an embodiment of the present disclosure. The service notification server 200 may be managed by the provider of the product or another entity responsible for providing service notification to the products.

The service notification server 200 may comprise a processing system 210 including at least one processor 212 and memory 214. The processing system 210 may be configured to provide service notifications for one or more products. The memory 214 may include a program providing the service notifications to the products and/or other devices.

The service notification server 200 may include server storage 220 storing information about different products, needed services and/or recalls associated with each product. For example, the server storage 220 may store a list of products with models and/or serial numbers. The list may include the recommended services and/or recalls for each product and may keep track of services and/or recalls that have been performed on each product registered with the server 200. The server 200 may receive the information for the list from the provider of the product or a user registering the product (e.g., via a user interface provided on the product or an application on a portable device). In one example, the server storage 220 may be provided remotely from the processing system 210.

The server storage 220 may store information about the customers of each product and may include the location of where the product is used. The customer and product location information may be received from the product, manufacturer of the product, and/or provider of the product. In one example, the server storage 220 may store additional locations of where to send service notifications besides the product. For example, the server storage 220 may store for one or more of a customer's phone number and/or an email address where the service can be sent. The server storage 220 may also store the contact information for scheduling a service needed to be performed on the product and/or contact information for one or more companies that can perform the services on the product.

As discussed in more detail below, the processing system 210 of the server 200 may be configured to send service data to the product. The service data to be sent to the product may be determined based on the request received from the product and/or the data stored in the server storage 220.

Figure 3:
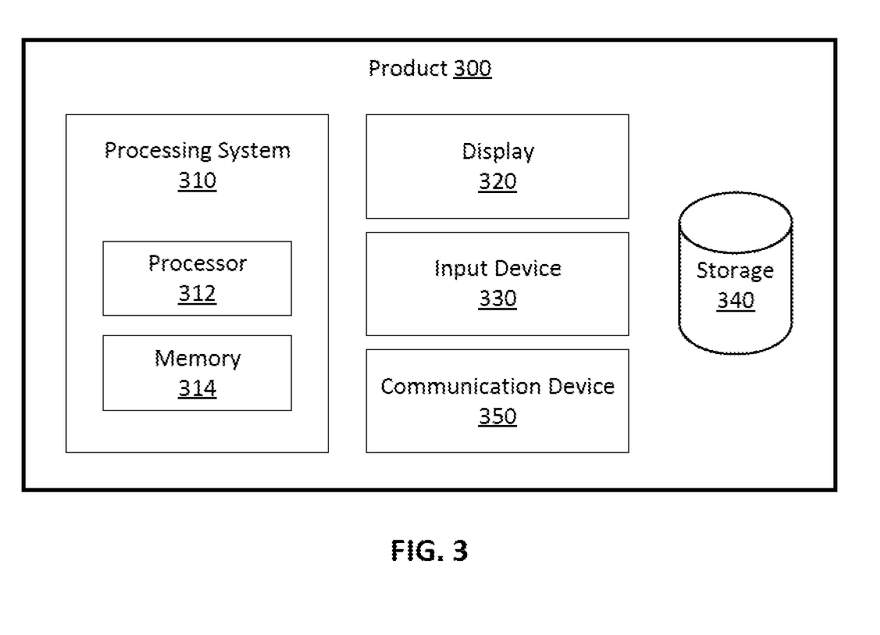
FIG. 3 illustrates a product configured to receive service data according to an embodiment of the present disclosure.

FIG. 3 illustrates a product 300 configured to receive service data according to an embodiment of the present disclosure. The product 300, which may be a consumer product such as an appliance (e.g., domestic appliance), may include a processing system 310 including at least one processor 312 and memory 314. The processing system 310 may be configured to receive service data and/or perform one or more operations in response to the received service notifications (e.g., display information related to the service notifications or disable one or more functions of the product 300).

The product 300 may include a display 320 for displaying service notifications. The display 320 may also display other information that the product 300 is configured to provide to the user (e.g., operations being performed by the product and/or product operating instructions).

The product 300 may include an input device 330 for receiving inputs from the user of the product 300. For example, the user may use the input device 330 to register the product with the provider of the product and/or acknowledge or dismiss service notifications. The input device 330 may be a touch screen which is part of the display 320.

The product 300 may include storage 340 for storing information about the product and/or the user of the product. The information about the product may include the model, serial number, product use information, location of the product, and/or performed service information. The information about the user may include the user's name, contact information (e.g., phone number or email address), billing information, address, and/or demographics. The information about the product may be pre-stored in the storage 340 by the provider of the product before the product is distributed to the user. The information about the user may be provided by the user (e.g., via the input device 330). Some of the information about the user may be input by the provider of the product (e.g., at the time the product is purchased, shipped, or manufactured). The information about the product and/or the user of the product may be transmitted to a server with a request for service data or when registering the product (e.g. server 200 shown in FIG. 2).

In one example, the product may store an application for a mobile device and/or a program to interface with an application operated on the mobile device. The application may provide a user interface to control operation of the product, input information about the user, display service notifications, and/or schedule services for the product.

Some of the information about the product that is stored in storage 340 may be obtained over time as the product is used. For example, the information about the product may include the number of times a particular operation has been performed by the product or number of hours that the product of a specific feature of the product has been used.

The product 300 may include a communication device 350 for communicating with the provider of the product (e.g., service notification server shown in FIG. 2). The communication device 350 may be configured to communicate with the server over the internet and via one or more home or local networks.

Figure 4:
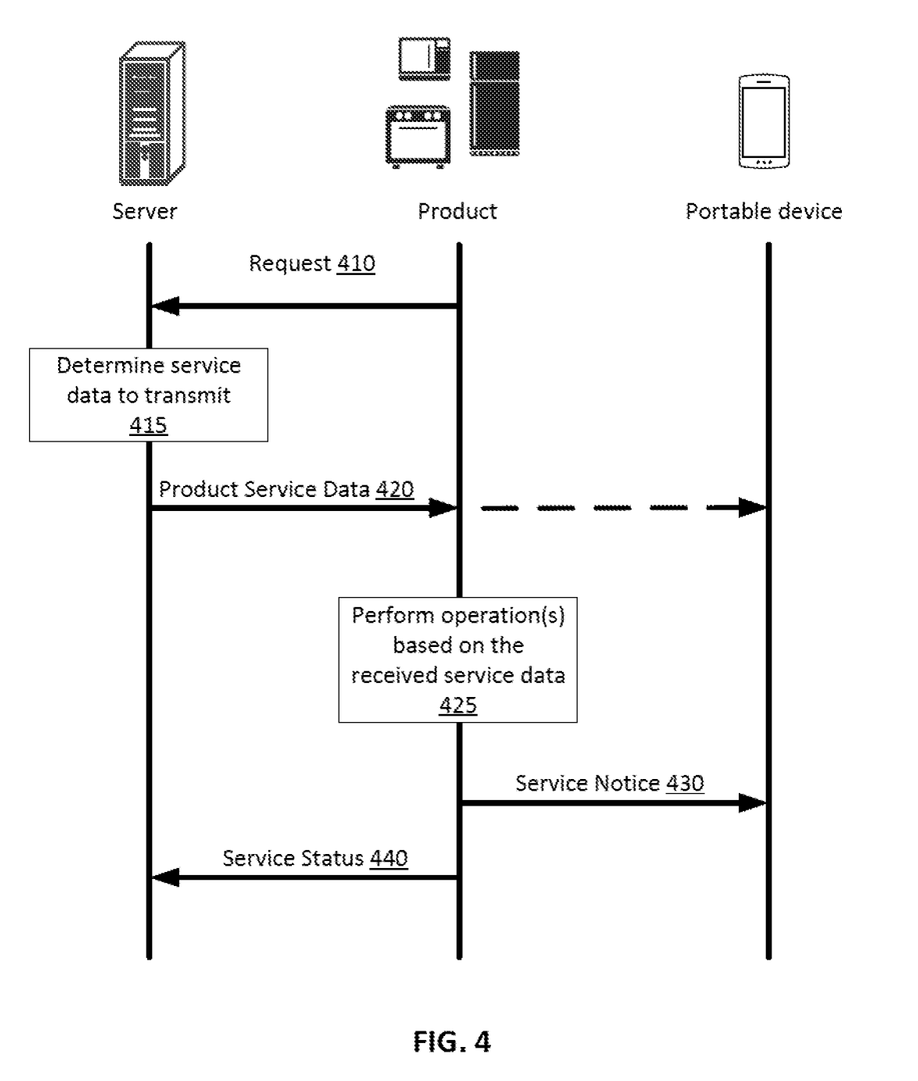
FIG. 4 illustrates a product receiving service data from a server according to an embodiment of the present disclosure.

FIG. 4 illustrates a product receiving service data from a server according to an embodiment of the present disclosure.

As shown in FIG. 4, the product may transmit a request 410 to a server configured to distribute service data. The location of where to transmit the request may be stored in the product storage by the manufacturer or distributor of the product.

The request 410 may include identification information of the product and/or a user associated with the product (e.g., owner of the product). The identification information in the request may include the model or the serial number of the product. In one example, the request may include information about repair services that have been performed on the product. The request may also include the location of the product (e.g., physical location or location on the network) and/or product use information (e.g., amount of time product has been operating or number of times a particular operation has been performed by the product). The location of the product may be input by a user, determined based on the network location, or determined by a sensor (e.g., GPS) included in the product.

In one example, the request may include only identification information of the product (e.g., serial number or a product ID number assigned to the product) and where to send service data.

The request may be transmitted by the product when the product is turned on, when the product establishes a connection with a communication network (e.g., the internet). In another example, the request may be transmitted periodically (e.g., weekly or monthly). The frequency of sending the request may be defined by the manufacturer or distributor of the product or a user of the product. The request may also be transmitted in response to a user input requesting the service data.

The server may receive the request 410 from the product and determine service data to transmit to the product 415. The determination may be made based on the information provided in the request 410 and the information stored in the server.

The service data 420 determined relevant for the product may be transmitted to the product in response to the request. In one example, the service data 420 may also be transmitted to a portable device (e.g., by voice message, text, and/or email). The portable device may be registered with the server or may be identified in the request transmitted by the product to the server.

Based on the received service data, the product may perform one or more operations 425. For example, as discussed in more detail below, the processing system of the product may, based on the received service data, display a recall notice provided in the received service data on a display associated with the product or reconfigure the product to restrict and/or disable one or more functions of the product.

As shown in FIG. 4, the product may transmit a service notice to a portable device registered with the product. The service notice transmitted to the portable device may include services that need to be performed on the product, information about the restricted or disabled functions of the product, and/or contact information for performing services on the product.

The product may transmit service status information 440 to the server. The service status information 440 may include a confirmation that the service notification was displayed to the user and/or acknowledged by the user. In one example, the service status information 440 may include information indicating that the needed service was performed on the product.

Figure 5:
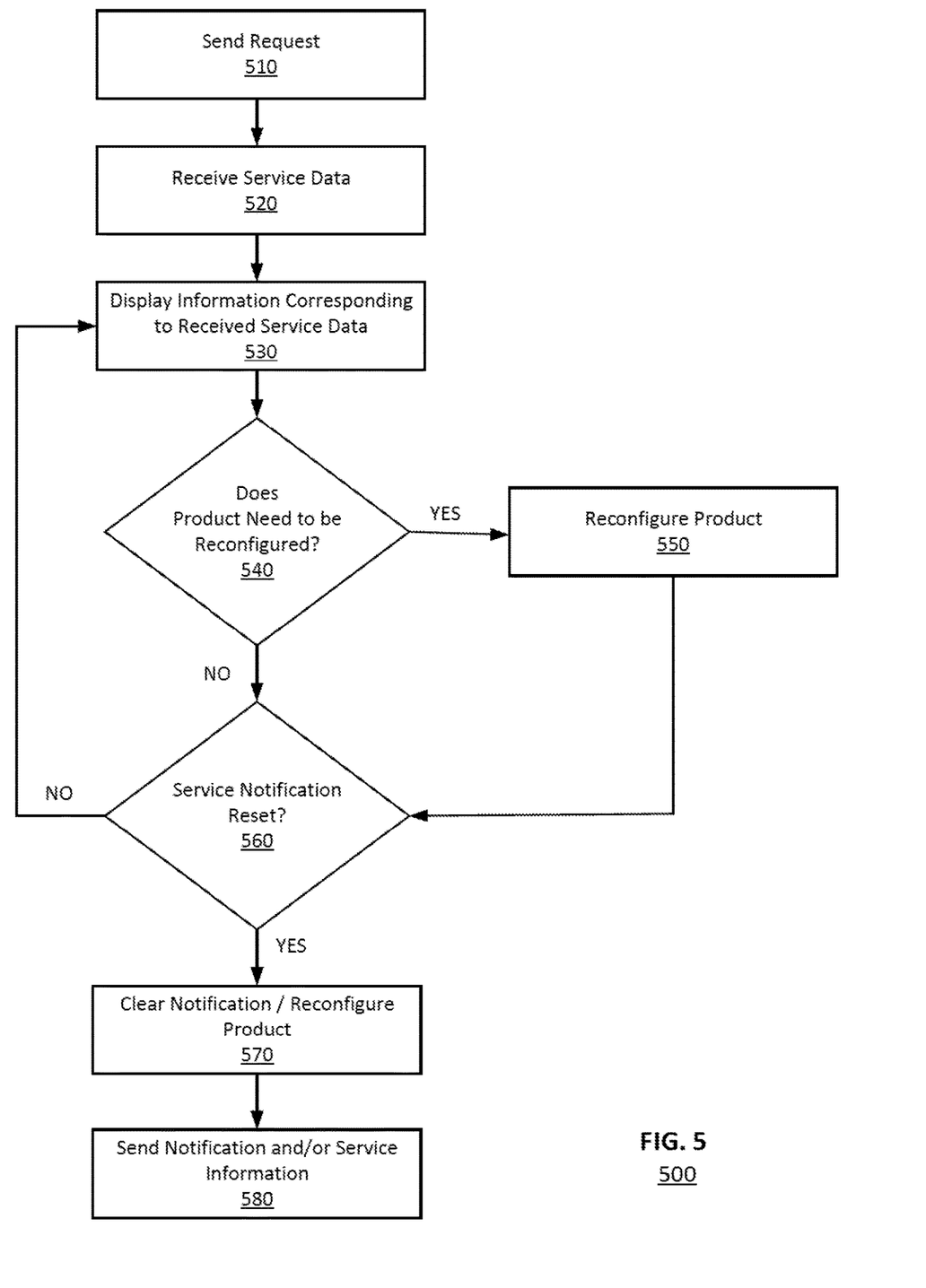
FIG. 5 illustrates a method for providing service notifications by a product according to an embodiment of the present disclosure.

FIG. 5 illustrates a method 500 for providing service notifications by a product according to an embodiment of the present disclosure. The method 500 may include sending a service data request 510, receiving service data 520, displaying information corresponding to the received service data 530, determining if product needs to be reconfigured 540, reconfiguring the product to restrict and/or disable one or more functions of the product 550, determining whether the service notification is reset 560, clearing display of notification 570, and sending notification and/or service information 580.

The product may be configured to request service data 510 from a server configured to provider service data. The location of where to send the request may be stored in the product memory (e.g., by a manufacturer or distributor of the product). The location of where to send the request may be updated based on data received from the server and/or by a user input (e.g., by user of the product or person performing service on the product).

The request may be sent by the product periodically, when the product is online (e.g., establishes connection with the internet), and/or in response to a user input requesting the service data. The request may include information identifying the product and/or the user or owner of the product. In one example, the request may include product use information, product location, and/or services performed on the product.

In response to the request, the product may receive service data from the server 520. The service data may include information about services that need to be performed on the product. The services that need to be performed on the product may include a software update for the product and/or a service to repair or replace parts of the product. The service data may include information indicating that no services need to be performed on the product (e.g., no recalls are out on the product). This determination may be made by the server based on repair services already performed on the product that are identified in the request.

In one example, the service data may include one or more codes identifying one or more services that need to be performed. For example, the code may identify that there is a recall out for the product and/or that there is a recommended service that should be performed on the product. The code may identify whether use of the product can be continued or whether the use of the product or specific features of the product should be discontinued. In one example, the code may identify a recall for a specific component (e.g., ice maker of a refrigerator or a heating element of a heating system) that needs to be services.

In one example, the service data may include all of the mandatory information required by a government entity or by a law for a recall of the specific product receiving the service data. For example, the service data may include all of the information required by the United States Consumer Product Safety Commission or the Consumer Product Safety Act. This information may include a description of the recall, recommended action, and contact information for correcting the identified problem with the product.

In one example, after the product receives the initial service data (e.g., a service code), a user may request additional information about the recall identified in the service data. For example, the service data may identify that there is a recall out for the appliance. After being notified of the recall by the product, the user may request additional information about the recall and/or contact information for a service company that can correct the problem identified by the recall. The additional information may be requested using a user interface provided by the product or on a portable device. In one example, the user may be provided with an option to receive the additional information about the service data from a web page.

In one example, the service data may be received from the server periodically without needing for the product to request the service data. In this embodiment, the server may store the digital address of the product and push the service data periodically to the product or when an issue with the product is identified.

In one example, the service data may include information about the importance of the service data (e.g., importance of the service code or service notification identified in the service data). For example, the service data may indicate whether a service is recommend or a critical service. Whether a service code is recommended or critical may be identified by a specific character (e.g., a 1 or 0) in a predefined position of the service code.

Information related to the received service data may be displayed 530 on a display associated with the service data. The display may be part of the product and may be used by the product to display other information associated with the operation of the product. For example, the display may be a display panel on a refrigerator used to control the setting of the refrigerator and/or used to display information retrieved from the internet (e.g., recipes requested by the user).

Displaying information related to the received service data 530 may include displaying a notification that a recall is out for the product. The notification may be displayed by a symbol (e.g., blinking symbol) or by a written message (service code or a description of the recall). In another embodiment, the displayed information may include an explanation of the services that need to be performed, recommended actions, and/or contact information for having the service performed. In one example, the displayed information may include displaying an option to automatically schedule a service request or replacement of the product. The option may be selected by a user input to automatically schedule a service request or replacement of the product.

In step 540, a determination may be made as to whether the product needs to be reconfigured. If it is determined that the product needs to be reconfigured (Yes in step 540), the product may be reconfigured to restrict and/or disable one or more functions of the product 550. In one example, all features of the product may be disabled in response to receiving the service data.

The determination that the product needs to be reconfigured may be made based on the received service data. The service data may include information indicating which features need to be restricted or disabled because of the recall. Accordingly, the features of the product that are not affected by the recall may continue to be used, while features that are affected by the recall may be disabled. For example, an option to perform a steam sanitary cycle by a dishwasher may be disabled while other cycles not involving steam feature may continue to be available.

In one example, determination to reconfigure the product may be made based on the product's use information and the service data. For example, the determination may be made to reconfigure the product if the service data indicates that the product needs be disabled if the product or a particular feature of the product has been used for a predetermined number of hours or a predetermined number of times. For example, options to start operation of a washing machine may be disabled if the washing machine has been used for a number of hours identified in the service data.

Once the information about the service data is displayed 530 and/or the product is reconfigured 550, the determination may be made as to whether the service notification has been reset 560. If the service notification has been reset (Yes in step 560), the notifications can be cleared 570 by clearing the display of the information related to the service data and/or enabling features that were previously disabled by reconfiguring the product.

The service notification can be reset by the user acknowledging that the information related to the service data has been seen, or that the needed service has been performed on the product. In one example, one or more of the service notifications identified in the service data may only be reset by authorized service personnel after the service has been performed on the product. For example, the service notification can be reset only after a predefined code for the recall identified in the service data is entered by the service personnel. Accordingly, the service data may include a service notice that indicates that the user of the product is not authorized to clear the notice and/or enable disabled features of the product. In this case only authorized personnel may have the ability to clear the notice and/or enable disabled features of the product.

The method 500 may include the product sending a notification to a server 580 about the status of the notifications provided in the service data. The notification may include information indicating that the information related to the service data (e.g., recall notice) has been displayed, that the user acknowledged that he has seen the information, that the service has been performed on the product, and/or that the service codes has be cleared on the product. Accordingly, the server receiving information about the status of the notifications can receive real time notification and/or repair statistics. This information may be beneficial for the manufacturer and/or distributor of the product for reporting requirements (e.g., to a Consumer Product Safety Commission).

In one example, service data may indicate a plurality of service notifications for the product. Each service notification may relate to a different recall. The received service data may include service notification for different products, and the processing system of the product may determine which service notification from the received notifications apply to the product receiving the service data. The processing system may display only notifications that apply to the product receiving the service data.

In one example, each service notification may include a flag indicating whether the service notification needs to be acknowledges before the product can be used. For example, if a service notification or a service code indicates that it is an important service notification, the product may be configured to disable one or more features of the product until an acknowledgment is received from a user that the information related to the service data has been seen. In another embodiment, when a service notification or a service code indicates that it is an important service notification, the processing system may be configured to transmit a notification about the service notification to a mobile device.

Figure 6:
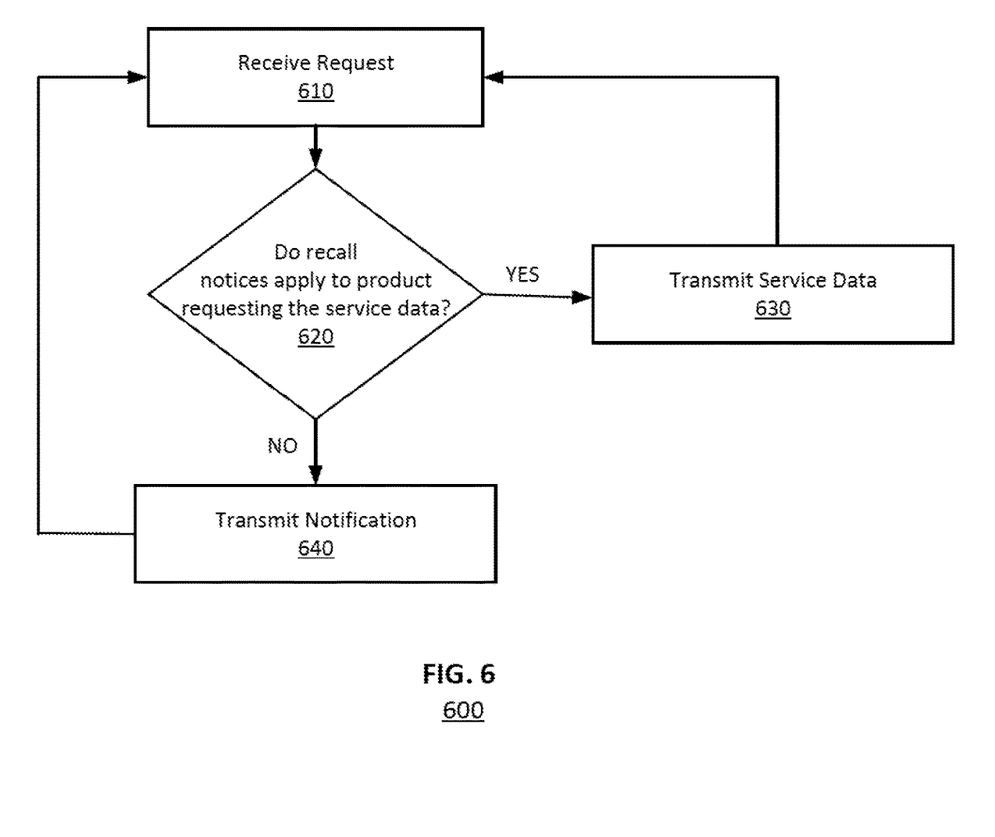
FIG. 6 illustrates a method for providing service notifications to a product requesting service data according to an embodiment of the present disclosure.

FIG. 6 illustrates a method 600 for providing service notifications to a product requesting service data according to an embodiment of the present disclosure. The method 600 may be performed by a processing system of a server (e.g., server shown in FIG. 2). The method 600 may include receiving a request for service data from a product 610, determining whether recall notices apply to product requesting the service data 620, and based on the determination, transmitting service data 630 or transmitting notice indicating that no recall notices apply to the product 640.

The request for service data may be received from a product (e.g., an appliance) over a communication link using communication circuitry. The request may include product identification information of the product sending the request. For example, the request may include the model number of an appliance and/or serial number of the appliance. The request may also include other information about the product and/or the user of the product.

The determination of whether a storage storing service notifications (e.g., recall notices) for a plurality of products includes one or more service notifications for the product requesting the service data 620 may be made based on the information provided in the request and/or other information stored in storage. The storage may include service notifications for a plurality of products that are updated based on information received from the manufacturer of the product, distributor of the product, and/or a government entity responsible for safety of the products. The storage may include information about which service notifications have been transmitted to one or more products. In one example, the server may receive and store, in storage, information from the product indicating which services associated with the service notification have already been performed.

When a determination is made that the one or more of the service notifications stored in the storage apply to the appliance requesting the service data (Yes in step 620), the method may include transmitting, using the communication circuitry, the service data with information identifying the one or more of the service notifications applying to the appliance requesting the service data 630.

When a determination is made that the service notifications stored in the storage do not apply to the appliance requesting the service data (No in step 620), the method may include transmitting, using the communication circuitry, a notification indicating that no recall notices are outstanding for the product requesting the service data.

As is evident from the forgoing description and the figures, the recall notice for a product can be quickly and easily provided to the user of the product. The provider of the product and/or the supplier of the product can communicate directly with a home appliance that is located in a consumer's home. The provider of the product and/or the supplier of the product may not need to directly contact the users of the product but can configure the product to directly receive the recall notifications for display to the user. The examples discussed above provide for service notices to be distributed with reduced distribution cost and a higher recall response rate.

The present technology provides certain advantages. For example, the recall notices can be provided to the user of the product in real-time. This allows for the user of the product to quickly be notified and quickly address problems with the product. In addition, the auto-disabling of the product and/or product features for critical safety alerts may reduce injuries caused by continued product use. In addition, the recall notification may include additional information (e.g., non-safety critical service notifications, contact information to places that can provide needed services on the product) with the recall notice. Furthermore, the provider of the recall notice can easily keep track of: the sent recall notices, recall notices that have been acknowledged by the user of the product, and/or services that have been performed in response to the transmitted recall notices.

The communication link (e.g., communication link 130 shown in FIG. 1) may be a network. The network may include: an internet, such as the Internet; an intranet; a local area network (LAN); a wide area network (WAN); an internal network, an external network; a metropolitan area network (MAN); a body area network (BAN); a vehicle area network (VAN); a home area network (HAN); a personal area network (PAN); a controller area network (CAN); and a combination of networks, such as an internet and an intranet. The network may be a wireless network (e.g., radio frequency waveforms, free-space optical waveforms, acoustic waveforms, etc.) and may include portions that are hard-wired connections (e.g., coaxial cable, twisted pair, optical fiber, waveguides, etc.).

Various storage devices (such as the memory shown in FIG. 2 or FIG. 3) may be utilized herein to store data (including instructions). For example, storage device(s) may include volatile and/or nonvolatile memory (or storage). Nonvolatile memory may include one or more of the following: read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, or other types of nonvolatile machine-readable media that are capable of storing electronic data (e.g., including instructions). Volatile storage (or memory) devices may include random access memory (RAM), dynamic RAM (DRAM), synchronous DRAM (SDRAM), static RAM (SRAM), or other types of storage devices. Also, various components discussed with reference to FIGS. 2 and 3 may communicate with other components through a computer network (e.g., via a modem, network interface device, or other communication devices).

Reference in the specification to "one embodiment" "an embodiment" "one example" or "an example" means that a particular feature, structure, or characteristic described in connection with the embodiment may be included in at least an implementation. The appearances of the phrase "in one embodiment" or "in one example" in various places in the specification may or may not be all referring to the same embodiment.

Also, in the description and claims, the terms "coupled" and "connected," along with their derivatives, may be used. In some examples of the disclosure, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples of the disclosure have been described in language specific to structural features and/or methodological acts, it is to be understood that claimed subject matter may not be limited to the specific features or acts described. Rather, the specific features and acts are disclosed as sample forms of implementing the claimed subject matter.

Some embodiments of the disclosure may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols.

The above-illustrated software components may be tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an examples of the disclosure may be implemented using Java, C++, or other object-oriented programming language and development tools. Another example of the disclosure may be implemented in hard-wired circuitry in place of, or in combination with machine readable software instructions.

In the above description, numerous specific details are set forth to provide a thorough understanding of embodiments of the disclosure. The disclosure is capable of other embodiments and of being practices and carried out in various ways. One skilled in the relevant art will recognize, however that the examples of this disclosure can be practiced without one or more of the specific details or with other methods, components, techniques, etc. In other instances, well-known operations or structures are not shown or described in details to avoid obscuring aspects of the disclosure. Also, it is to be understood that the phraseology and terminology employed herein are for the purpose of the description and should not be regarded as limited.

Although the processes illustrated and described herein include series of steps, it will be appreciated that the different examples of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The invention claimed is:

1. A domestic appliance comprising:
communication circuitry;
a processing system, comprising at least one processor, the processing system coupled to the communication circuitry and being configured to:
receive, using the communication circuitry, service data from a server, the service data including a service code identifying one or more services that need to be performed on the domestic appliance;
disable, based on the received service code, one or more features of the domestic appliance while permitting one or more other features to be operational if the received service code identifies a non-safety critical service to be performed on the domestic appliance;
disable, based on the received service code, operation of the domestic appliance if the received service code identifies a safety critical service to be performed on the domestic appliance; and
in response to an input indicating that the one or more services corresponding to the service code have been performed on the domestic appliance, enable the one or more features of the domestic appliance that were disabled.

2. The domestic appliance of claim 1, further comprising a display coupled to the processing system, and wherein the processing system is further configured to:
control the display to display the service code included in the received service data; and
in response to a user input indicating that the services associated with the received service code have been performed on the domestic appliance, control the display to stop displaying the service code.

3. The domestic appliance of claim 1, further comprising a display coupled to the processing system, and wherein the processing system is further configured to control the display to display the service code and a description of the service code included in the received service data.

4. The domestic appliance of claim 1, further comprising a display coupled to the processing system, and wherein the processing system is further configured to:
in response to a request sent to a server for information about the service code included in the received service data,
receive a description of the service code; and
control the display to display the received description of the service code.

5. The domestic appliance of claim 4, wherein the description of the service code includes contact information to request service for the domestic appliance, contact information to obtain more information about the service code, and/or contact information to replace the domestic appliance.

6. The domestic appliance of claim 1, wherein the processing system is further configured to:
in response to the user input indicating that the services associated with the received service code have been performed on the domestic appliance, transmit, to the server, data indicating that services associated with the service code have been performed on the domestic appliance.

7. The domestic appliance of claim 1, wherein the input indicating that the one or more services identified in the service data have been performed on the domestic appliance is a predefined code associated with the one or more services identified in the service data.

8. The domestic appliance of claim 1, wherein the received service data includes a predefined code and the processing system is further configured to:
compare the input to the predefined code; and
enable the one or more features of the domestic appliance that were disabled when the input corresponds to the predefined code.

9. A domestic appliance comprising:
communication circuitry;
a processing system, comprising at least one processor and memory, the processing system coupled to the communication circuitry and being configured to:
transmit, using the communication circuitry, a request for recall information for the domestic appliance;
in response to the request for recall, receive, from a server, recall information for the domestic appliance;
display, on a display coupled to the domestic appliance, the received recall information for the domestic appliance, and
selectively disable one or more features of the domestic appliance while permitting one or more other features of the domestic appliance to be operational based on the recall information.

10. The domestic appliance of claim 9, wherein the recall information includes a service code and the processing system is configured to display, on the display, the service code.

11. The domestic appliance of claim 10, wherein the recall information includes information about the service code and the processing system is configured to display, on the display, the information about the service code.

12. The domestic appliance of claim 11, wherein the information about the service code includes a description of the service code, contact information to request service for the appliance, contact information to obtain more information about the service code, and/or contact information to replace the domestic appliance.

13. The domestic appliance of claim 11, wherein the processing system is further configured to:
when the received service code includes a flag indicating that it is a service code identifying a non-safety critical service or a safety critical service, transmit, using the communication circuitry, a notification to a mobile device registered in the memory.

14. The domestic appliance of claim 11, wherein the processing system is further configured to:
when the received service code includes a flag indicating that it is a service code identifying a non-safety critical service, disable the one or more features of the domestic appliance which are associated with the service code identifying the non-safety critical service to be performed while permitting the one or more other features to be operational, and
when the received service code includes a flag indicating that it is a service code identifying a safety critical service, disable operation of the domestic appliance.

15. The domestic appliance of claim 14, wherein the received recall information includes a predefined code and the processing system is further configured to:
compare an input received at an input device associated with the domestic appliance to the predefined code; and
enable the one or more features of the domestic appliance that were disabled when the input corresponds to the predefined code.

16. The domestic appliance of claim 1, wherein the one or more features of the domestic appliance includes one or more functions or operations capable of being performed by the domestic appliance.

17. The domestic appliance of claim 1, wherein the processing system is further configured to restrict, based on the received service code, one or more additional functions or operations capable of being performed by the domestic appliance if the received service code identifies the non-safety critical service, and in response to the input indicating that the one or more services corresponding to the service code have been performed on the domestic appliance, remove the restrictions on the one or more additional functions or operations capable of being performed by the domestic appliance that were restricted.

18. The domestic appliance of claim 14, wherein the one or more features of the domestic appliance includes one or more functions or operations capable of being performed by the domestic appliance.

\* \* \* \* \*